United States Patent Office 2,696,025
Patented Dec. 7, 1954

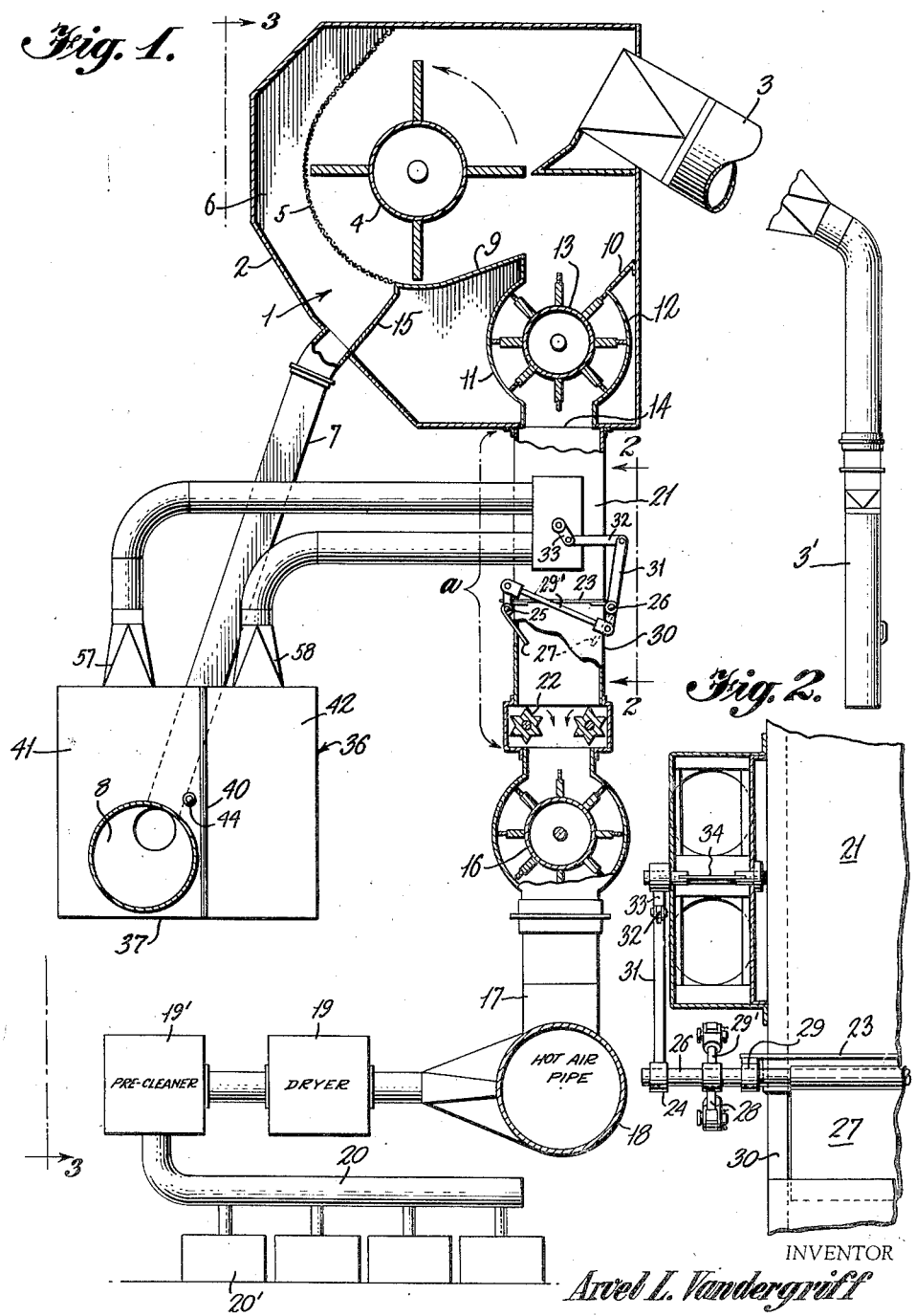

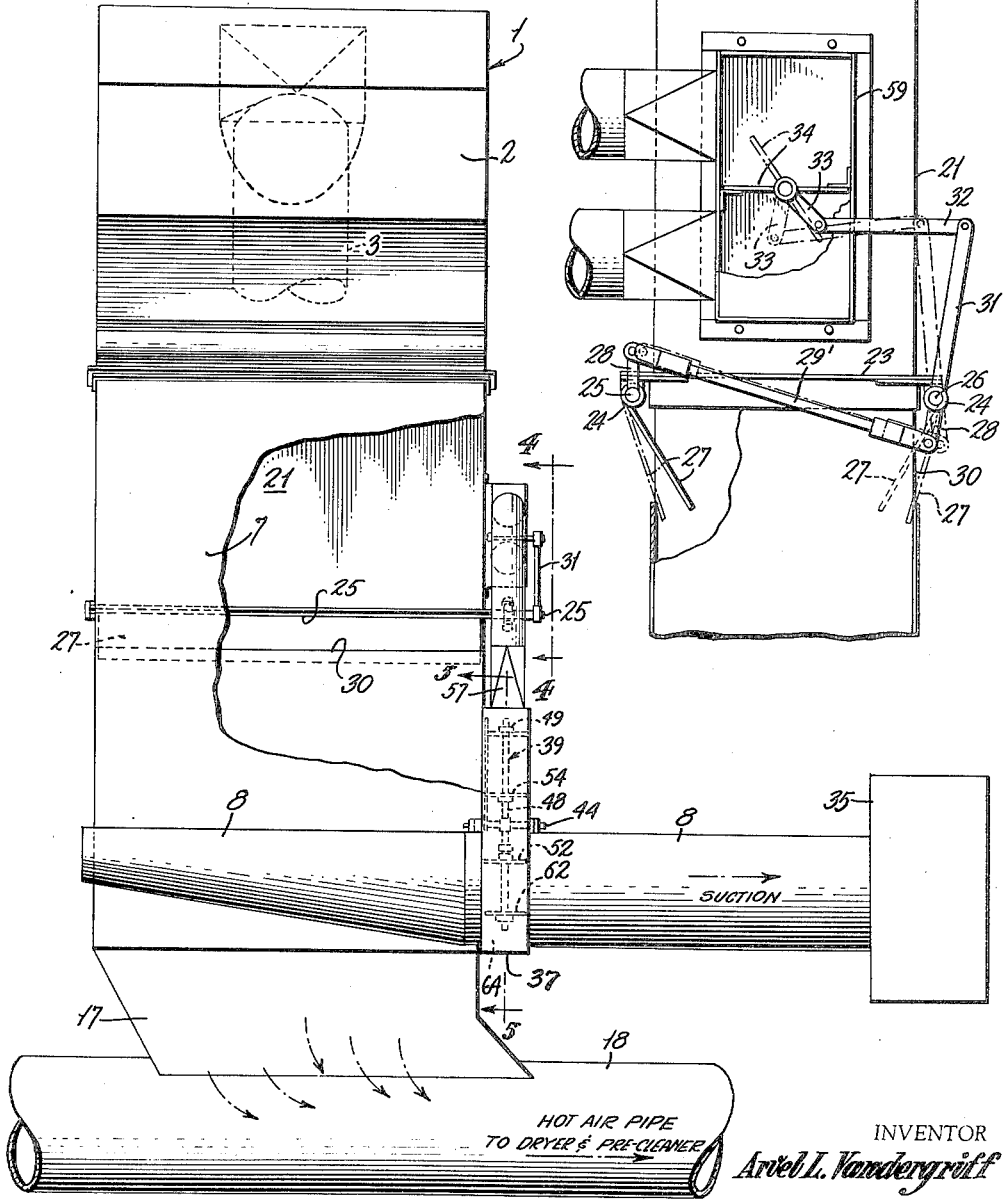

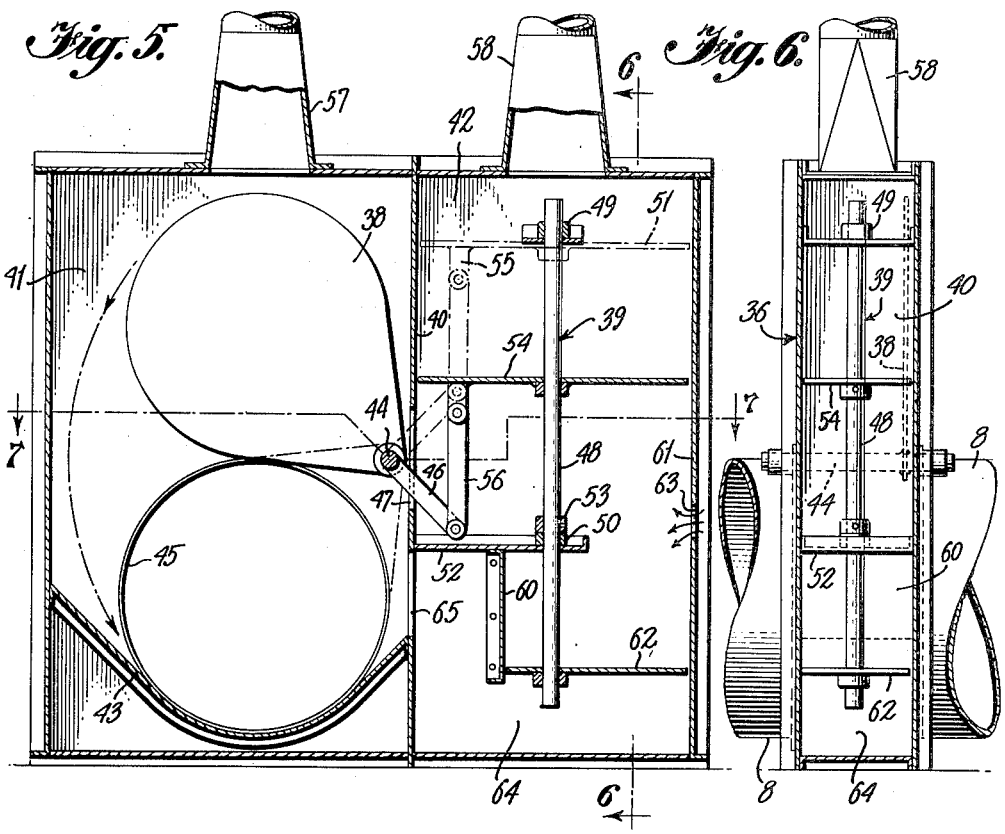

2,696,025

MEANS FOR CONTROLLING SUPPLY OF SEED COTTON TO PRECLEANING AND DRYING EQUIPMENT

Arvel L. Vandergriff, Columbus, Ga., assignor to Lummus Cotton Gin Company, Columbus, Ga., a corporation of Georgia Application August 31, 1951, Serial No. 244,628

7 Claims. (Cl. 19—69)

This invention relates to cotton handling in the gin plant and particularly to a system and apparatus for controlling the supply of seed cotton from the wagon or cotton house to the precleaning and drying equipment ahead of the distributor which distributes the cotton to the individual gin units, which precleaning and drying equipment may be conventional.

It is common practice in modern gin plants for the cleaning and drying equipment to handle the cotton in bulk as it comes from the wagon or cotton house. This cotton is picked up at the source of supply by a suction telescope which is moved over the cotton by an operator. This operator if properly trained can in some cases feed the cotton into the gin plant at about the rate required to feed the individual gin units which are under controlled rate of feed. However, in most cases, the suction telescope feeds the cotton through the drying and precleaning equipment at a rate much greater than is necessary to supply the individual gin units, the excess being delivered at a point ahead of the gin units to an overflow bin by the distributor.

Since the efficiency of the drying and precleaning equipment is affected by the rate at which it handles the cotton, the excess quantity going through this equipment clearly lowers its efficiency.

In the conventional system for moving the seed cotton from the source of supply to the distributor, the suction telescope delivers it to a separator in which the cotton is separated from the vehicle air and dropped through a conduit to a hot air pipe in which a current of air is flowing from a burner, which entrains the cotton and carries it first to a drier and then to suitable precleaning apparatus from which it is delivered to the distributor, and from this to the individual gin unit. There is no control of the rate at which cotton is supplied until the gin units are reached which are regulated to handle just so much cotton, the excess being discharged into a storage bin, as previously related. The separator is connected to a vacuum conduit and the vacuum which separates the air from the cotton is the same vacuum that draws cotton from the source of supply through the suction telescope into the separator.

The general object of the present invention is to provide in the conduit between the separator and hot air pipe, driven feed control means set to pass cotton at the rate at which the gin units are regulated to handle it, so that excess cotton accumulates in the part of said conduit anterior to said feed control means, and providing in said anterior portion means responsive to the accumulation of excess cotton for cutting off the vacuum from said suction telescope, and keeping it cut off while said excess persists.

Another object of the invention is to provide a valve in the vacuum conduit which exhausts the separator, for periodically cutting off the vacuum from said suction telescope, a vacuum motor for operating said valve deriving its motive suction from a branch of said vacuum conduit, the excess cotton responsive means being operably connected to a pilot valve which controls the admission of vacuum to said motor.

A further object of the invention is in the novel construction of the vacuum cutoff valve and the operating motor therefor.

Other objects of the invention will appear as the following description of a practical embodiment thereof proceeds.

In the drawings throughout the figures of which the same reference characters have been employed to denote identical parts:

Figure 1 is an end view of apparatus embodying the principles of the invention, shown partly in elevation, partly in section, and in part diagrammatic;

Figure 2 is a cross-section taken along the line 2—2 of Figure 1;

Figure 3 is an end elevation viewed in the direction of the arrows on the line 3—3 of Figure 1;

Figure 4 is an end view in elevation taken in the direction of the arrows along the line 4—4 of Figure 3;

Figure 5 is a section taken on the line 5—5 of Figure 3;

Figure 6 is a cross-section taken along the line 6—6 of Figure 5;

Figure 7 is a horizontal section taken along the line 7—7 of Figure 5.

Referring now in detail to the several figures, the numeral 1 represents the separator which is a known piece of apparatus comprising the casing 2, into which one end of the seed cotton supply pipe 3 opens, the opposite end of said pipe being connected to the suction telescope which picks up seed cotton from the wagon or cotton house. A driven paddle wheel 4 is journaled in the casing on a horizontal axis which is below the mouth of the pipe 3. Behind the paddle wheel and closely adjacent the path of movement of the ends of the paddles is the screen 5 which forms the forward wall of a vacuum chamber 6 in communication with a vacuum line 7, the latter joining the small end of a graduated main vacuum conduit 8. The casing 1 contains irregularly shaped partitions 9 and 10 having similar arcuate portions 11 and 12 which form opposite seats for a feeder valve 13. The partitions 9 and 10 are spaced above and below said valve to form respectively a cotton inlet to said valve and a cotton discharge below said valve. The casing has a discharge opening 14 in register with the cotton discharge. The valve 13 is a driven drum having radial vanes from end to end, tipped by flexible flaps substantially contacting the valve seats. All of the features of the separator above described, except the pipe 3 and vacum line 7, extend from end to end of the casing, which for example may be from four to six feet wide. The arrow indicates the direction of rotation of the paddle wheel 4.

The seed cotton with vehicle air delivered by the supply pipe 3 is carried over against the screen by the paddle wheel, the air and loose trash being drawn through the screen into the vacuum chamber and into the vacum line 7. The partition 9 has a flat inclined portion 15 which meets the casing in line with the lower edge of the mouth of the vacuum line 7, thus avoiding any ledge within the vacuum chamber 6, upon which trash may lodge. The cotton freed from air, is pushed by the paddle wheel into the valve 13, which carries it to the discharge opening 14. The valve acts as a seal to prevent the vacuum within the casing of the separator from drawing air up through the discharge opening. If the structure embraced within the bracket *a* in Figure 1 were omitted and substituted by a section of plain pipe, the passage of cotton from the separator to the distributor would represent the conventional system employed in modern gin plants in which the cotton from the separator passes through a vacuum sealing feeder 16 similar to the feeder valve 13 and through a conduit 17 which debouches into the hot air pipe 18. Said hot air pipe conducts the cotton, in a flowing column of hot air from a burner, successively through a drier 19 and a precleaner 19′ (diagrammatically shown), thence to the distributor 20 through which it goes to the individual gin units 20′. The conduit 17 is under vacuum produced by the entrainment action of the column of hot air passing the mouth of the conduit 17.

The structure intercalated between the separator and vacuum feeder and shown embraced within the bracket, is part of the present invention, the idea being to produce a zone in which excess cotton accumulates, as close as practicable to the separator. The numeral 21 represents an open ended hopper of generally uniform cross-sectional area. At its upper end it is connected to the under side of the separator in register with the discharge opening 14 and at its lower end it is connected to a fitting which carries the driven feed rolls 22. The speed at which these rolls turn determines the amount of cotton which will pass between them, and the operator sets their speed at a rate to properly feed the individual gin units. The sealing function of the feeder valve 13 and sealing feeder 16 prevent any air current in either direction from passing through the hopper 21 which would influence the feeding capacity of the feed rolls 22. When the suction telescope feeds cotton to the separator faster than it will pass between the feed rolls, the hopper will begin to fill with excess cotton which acquires some pressure, since the cotton is being supplied to the hopper by the feeder valve 13.

The hopper 21 is provided in a transverse plane intermediate its ends with an angle frame 23, affording support for a pair of shafts 25 and 26 extending along opposite sides of the hopper journaled in bearings, one of which is shown at 29 in Figure 2. A pair of similar pressure plates 27 are provided, one for each shaft, fixed thereto. The shafts have the oppositely directed crank arms 28 fixed to the extended ends, said crank arms being pivotally connected to the ends of a link 29'. Thus both pressure plates move in unison either outwardly or inwardly. The free ends of said plates normally project on the inside of the hopper through louvers 30, provided in its opposite side walls. One of the shafts 26 has a rock arm 31 with hub 24 fixed thereto extending, in the embodiment shown in the drawings, in an upward direction, its upper end being connected by a pivoted link 32 with the crank arm 33 on the shaft of a butterfly type pilot valve 34.

The pressure plates are the excess cotton responsive means, and the pilot valve 34 operated thereby is the instrumentality for controlling the vacuum through the suction telescope and separator in a manner that will presently be explained.

Now referring to the vacuum conduit 8, this purges air and trash from the separator through the vacuum line 7, which as already stated, is connected to the smaller graduated end of the conduit 8, and discharges through a vacuum fan 35. At some convenient point between the vacuum fan and the point of connection of the vacuum line 7, the conduit 8 is broken to permit the interposition of the unit 36 which, as shown, is a rectangular box 37 containing the cutoff valve 38 and the vacuum motor 39. The box 37 is divided by a vertical partition 40 defining two compartments 41 and 42. The divided extensions of the conduit 8 are connected to the opposite walls of the compartment 41 so that the latter is normally under vacuum. Said compartment has a curved partition 43 forming a concave bottom upon which trash brought in by the vacuum conduit may momentarily deposit, but the conduit 8 enters and leaves this compartment with its lower edge flush with this partition so as to prevent any accumulation of trash in the compartment. The cutoff valve 38 is of the gate type. It is a flat plate fixed to a shaft 44 journaled in the opposite side walls of said compartment near one end of said shaft and operates close to the inlet opening 45 of the conduit 8 into said compartment, being normally above said opening, descending to close said opening. The shaft 44 has an operating arm 46 fixed thereto which extends through a slot 47 in the partition 40 into the compartment 42.

The motor 39 which occupies the compartment 42 consists of a vertical rod 48 slidably mounted in aligned spaced guides 49 and 50, carried by respective braces 51 and 52 secured to the sides of the compartment. The brace 52 is below the slot 47 and consists of an imperforate plate extending between the more narrowly spaced sides of the compartment, for a reason that will presently appear. The rod 48 carries an adjustable stop 53 which contacts the guide 50 to limit the downward range of movement of the rod. At an intermediate position between the guides, said rod carries a diaphragm 54 perpendicular thereto, which slidably fits the inside cross-section of the compartment 42 with slight clearance all around, in the interest of minimizing friction. The slight amount of air drawn through the slot 47 in the partition 40, or past the diaphragm 54, is negligible in its effect upon the operation of the apparatus. The under side of the diaphragm 54 has the depending lug 55 to which the link 56 is pivotally connected, said link being pivotally connected to the arm 46 which moves the cutoff valve.

The diaphragm 54 rises to close the cutoff valve responsive to suction applied to the chamber of the compartment 42 above said diaphragm. This suction is obtained by tapping the conduit 8 at a convenient point. In the form shown, this point is at the top of the compartment 41 which has an opening to which a pipe 57 of relatively small cross-section is connected. This pipe leads to the pilot valve and a return pipe 58 leads from the pilot valve to an opening in the top wall of the compartment 42. The pilot valve operates in a rectangular box 59, which acts as a return bend for the pipes 57 and 58 to which it is connected, the pilot valve being between the points of connection of said pipes and fitting the cross-section of said box so as to cut off vacuum from the compartment 42 when it is closed, and to establish suction in said compartment when it is open. The pilot valve is normally closed, being biased to closed position under the dominant weight of the connections represented by the rock arm 31 and link 32, which may be supplemented by a spring or additional weight, if necessary.

In operation, the accumulation of excess cotton in the hopper 21 above the feed rolls 22 causes the cotton to push the pressure plates 27 outwardly, operating the linkage that connects said plates to the pilot valve so as to open the latter and establish vacuum in the upper part of compartment 42, thereby lifting the diaphragm 54 and operating the linkage between said diaphragm and the cutoff valve 38, to close said cutoff valve. This substantially cuts off the suction through the vacuum line 7, the separator and the suction telescope, so that no more cotton is fed to the separator. As soon as the feed rolls have depleted the excess cotton in the hopper, the pressure plates move inwardly under the bias of the unbalanced weight of the linkage and the pilot valve is moved to closed position, cutting off the vacuum from the upper part of the diaphragm 54, permitting it to fall and to allow the cutoff valve 38 to open.

Now, the cutoff valve represents an unbalanced weight which tends to cause it to overcome the weight of the motor and stay normally closed, holding the diaphragm 54 up even when the chamber above it is relieved of suction. For the purpose of offsetting the weight of the cutoff valve 38, means are provided for normally holding it in open position by a counterbalancing vacuum. The brace 52 has already been described as an imperforate plate extending between the narrowly spaced sides of the compartment 42. This brace also lies against the partition 40. A vertical plate 60 is fixed against the under side of the brace 52 at a distance from the partition 40, parallel to the outer side 61 of the compartment 42, and also extending between the more narrowly spaced sides of the compartment. A counterbalancing diaphragm 62, fixed to the rod 39, slides between the plate 60 and the side 61, said side being provided with an atmospheric opening 63 between the diaphragms. The brace 52, plate 60, and diaphragm 62 form a barrier which defines with the lower part of the compartment 42 a chamber 64 substantially separated from that part of said compartment which is above said barrier. This chamber is in permanently open communication with the compartment 41 by means of an opening 65 below the brace 52.

It is to be noted that the cutoff valve 38 does not close against the inlet opening 45, but moves in a plane slightly spaced therefrom, so that there is always some vacuum in the compartment 41 and in the chamber 64. The extent of this vacuum and the area of the counterbalancing diaphragm 62 are so correlated that the motor is normally maintained in a downward position with the cutoff valve in open position, except when suction is imposed upon the upper diaphragm 54. The two diaphragms are in effect differential pistons, so that although the same vacuum is in the chambers above the upper diaphragm and below the lower diaphragm when the pilot valve is opened, the upper suction dominates the lower suction, since it is against the larger diaphragm, which is another way of saying that the air admitted between the diaphragms through the atmospheric inlet 63 is more effective against the larger diaphragm than against the smaller when the vacuum tension of the opposite sides of said diaphragms is the same.

While I have in the above description disclosed what I believe to be a practical embodiment of the invention, it will be understood by those skilled in the art that the specific details of construction and arrangement of parts, as shown and described, are by way of example and not to be construed as limiting the scope of the invention.

What I claim is:

1. In cotton handling apparatus, a suction telescope, a cotton and air separator, and a vacuum conduit, serially connected, said vacuum conduit being connected to a source of suction, a gin unit, a cotton conduit from said separator to said gin unit for conducting cotton separated from the vehicle air to said gin unit, drying and precleaning apparatus intercalated in said cotton conduit between said separator and gin unit, driven means in said cotton conduit between said separator and said drying and precleaning apparatus for feeding cotton toward said drying and precleaning apparatus at the rate at which the gin handles it, thereby producing an accumulation of excess cotton in a zone of said conduit between said feeding means and separator when cotton is presented to said feeding means at a greater volume rate than the gin handles it, a cutoff valve in said vacuum conduit for cutting off effective suction through said telescope, a vacuum actuated motor for operating said cutoff valve, a branch conduit from said vacuum conduit to said motor, a pilot valve in said branch conduit for controlling the imposition of vacuum upon said motor, and means in said cotton conduit in said zone of excess cotton accumulation, operatively connected to said pilot valve responsive to the pressure of excess cotton for operating said pilot valve to actuate said motor to close said cutoff valve.

2. In cotton handling apparatus, a suction telescope, a cotton and air separator, and a vacuum conduit, serially connected, said vacuum conduit being connected to a source of suction, a gin unit, a cotton conduit from said separator to said gin unit for conducting cotton separated from the vehicle air to said gin unit, drying and precleaning apparatus intercalated in said cotton conduit between said separator and gin unit, driven means in said cotton conduit between said separator and said drying and precleaning apparatus for feeding cotton toward said drying and precleaning apparatus at the rate at which the gin handles it, thereby producing an accumulation of excess cotton in a zone of said conduit between said feeding means and separator when cotton is presented to said feeding means at a greater volume rate than the gin handles it, a cutoff valve in said vacuum conduit for cutting off effective suction through said telescope, a pair of pressure plates interlinked so as to move in unison, hingedly mounted at opposite sides of said cotton conduit in said zone of excess cotton accumulation having their free ends normally extended within said conduit in restrictive relation to the cross-sectional area of said conduit, a vacuum actuated motor for operating said cutoff valve, a branch pipe from said vacuum conduit to said motor having an intermediate portion adjacent said pressure plates, a pilot valve within said intermediate portion for controlling the passage of air through said branch pipe, a connection between said interlinked pressure plates and said pilot valve for operating the latter, said pressure plates being movable responsive to the pressure of excess cotton between them for opening said pilot valve to admit vacuum to said motor for closing said cutoff valve.

3. In cotton handling apparatus, a suction telescope, a cotton and air separator, and a vacuum conduit, serially connected, said vacuum conduit being connected to a source of suction, a gin unit, a cotton conduit from said separator to said gin unit for conducting cotton separated from the vehicle air to said gin unit, drying and precleaning apparatus intercalated in said cotton conduit between said separator and gin unit, driven means in said cotton conduit between said separator and said drying and precleaning apparatus for feeding cotton toward said drying and precleaning apparatus at the rate at which the gin handles it, thereby producing an accumulation of excess cotton in a zone of said conduit between said feeding means and separator when cotton is presented to said feeding means at a greater volume rate than the gin handles it, a cutoff valve in said vacuum conduit for cutting off effective suction through said telescope, a pair of pressure plates interlinked so as to move in unison, hingedly mounted at opposite sides of said cotton conduit in said zone of excess cotton accumulation having their free ends normally extended within said conduit in restrictive relation to the cross-sectional area of said conduit, a vacuum actuated motor for operating said cutoff valve, a casing mounted on said cotton conduit adjacent said pressure plates, a pilot valve mounted in said casing dividing the chamber of said casing, when closed, a branch pipe having a portion leading from said vacuum conduit to said casing and a portion leading from said casing to said motor, the connections of said branch pipe to said casing being on opposite sides of said pilot valve whereby the latter controls the evacuation of said motor, a connection between said interlinked pressure plates and said pilot valve for operating the latter, said pressure plates being movable responsive to the pressure of excess cotton between them for opening said pilot valve to admit vacuum to said motor for closing said cutoff valve.

4. In cotton handling apparatus, a suction telescope, a cotton and air separator, and a vacuum conduit, serially connected, said vacuum conduit being connected to a source of suction, a gin unit, a cotton conduit from said separator to said gin unit for conducting cotton separated from the vehicle air to said gin unit, drying and precleaning apparatus intercalated in said cotton conduit between said separator and gin unit, said cotton conduit including a unitary portion between said separator and said drying and precleaning apparatus comprising a hopper into which said separator discharges, driven feed rolls at the lower end of said hopper for feeding cotton toward said drying and precleaning apparatus at the rate at which the gin handles it, thereby producing an accumulation of excess cotton in said hopper when cotton is presented to said feed rolls at a greater volume rate than the gin handles it, a cutoff valve in said vacuum conduit for cutting off effective suction through said telescope, a vacuum actuated motor for operating said cutoff valve, a pair of pressure plates hingedly mounted on opposite sides of said hopper having their free ends extended within said hopper through correspondingly positioned louvers, in restrictive relation to the cross-sectional area of said hopper, means interlinking said pressure plates so that they move in unison, a casing mounted on the outside of said hopper, a pilot valve mounted within said casing dividing the chamber of said casing when closed, a branch pipe having a portion leading from said vacuum conduit to said casing and a portion leading from said casing to said motor, the connections of said branch pipe to said casing being on opposite sides of said pilot valve whereby the latter controls the evacuation of said motor, a connection between said interlinked pressure plates and said pilot valve for operating the latter, said pressure plates being movable responsive to the pressure of excess cotton between them for opening said pilot valve to admit vacuum to said motor for closing said cutoff valve.

5. In cotton handling apparatus, a suction telescope, a cotton and air separator, and a vacuum conduit, serially connected, said vacuum conduit being connected to a source of suction, a gin unit, a cotton conduit from said separator to said gin unit for conducting cotton separated from the vehicle air to said gin unit, drying and precleaning apparatus intercalated in said cotton conduit between said separator and gin unit, driven means in said cotton conduit between said separator and said drying and precleaning apparatus for feeding cotton toward said drying and precleaning apparatus at the rate at which the gin handles it, thereby producing an accumulation of excess cotton in a zone of said conduit between said feeding means and separator when cotton is presented to said feeding means at a greater volume rate than the gin handles it, a cutoff valve unit including a vacuum motor for operating said cutoff valve, said unit comprising a box having a partition dividing it into two compartments, one compartment having aligned inlet and discharge openings in opposite sides near the bottom, and being intercalated in the vacuum conduit to form a part thereof, anterior to said source of suction, with the adjacent ends of said conduit connected to the respective openings, a gate valve in said compartment swingable in a vertical plane about an axis within said compartment, from a normally open position above said inlet opening to a closing position confronting said inlet opening, a diaphragm motor in said other compartment comprising a reciprocably mounted slide rod and a diaphragm carried thereby reciprocable therewith, said diaphragm substantially fitting the cross-section of the part of said other compartment in which it reciprocates, defining with said compartment a chamber at one side of said diaphragm, an operating connection from said diaphragm to said cutoff valve, a branch conduit establishing communication between said vacuum conduit and said chamber, a pilot valve in said branch conduit for controlling the admission of vacuum to said chamber, and means in said cotton conduit in said zone of excess cotton accumulation, operatively connected to said pilot valve and responsive to the pressure of excess cotton for operating said pilot valve to actuate said motor to move said cutoff valve to closing position and effectively cut off suction through said telescope.

6. In cotton handling apparatus, a suction telescope, a cotton and air separator, and a vacuum conduit, serially connected, said vacuum conduit being connected to a source of suction, a gin unit, a cotton conduit from said separator to said gin unit for conducting cotton separated from the vehicle air to said gin unit, drying and precleaning apparatus intercalated in said cotton conduit between said separator and gin unit, driven means in said cotton conduit between said separator and said drying and precleaning apparatus for feeding cotton toward said drying and precleaning apparatus at the rate at which the gin handles it, thereby producing an accumulation of excess cotton in a zone of said conduit between said feeding means and separator when cotton is presented to said feeding means at a greater volume rate than the gin handles it, a cutoff valve unit including a vacuum motor for operating said cutoff valve, said unit comprising a box having a partition dividing it into two compartments, one having aligned inlet and discharge openings in opposite sides near the bottom, and being intercalated in the vacuum conduit to form part thereof, with the adjacent ends of said conduit connected to the respective openings, a gate valve of unbalanced weight in said compartment swingable in a vertical plane about an axis within said compartment, from a normally open position above said inlet opening to a closing position confronting said inlet opening, slightly spaced therefrom, partition means in said other compartment reducing the cross-section of the lower part thereof, a diaphragm motor in said other compartment comprising a reciprocatory member, spaced diaphragms of different area carried thereby and reciprocable therewith, the larger diaphragm substantially fitting the part of said other compartment of larger cross-section defining with the upper part of said compartment a chamber, the smaller diaphragm substantially fitting the part of smaller cross-section, said partition means and last named diaphragm defining with the lower part of said compartment a chamber, a branch conduit from said first named compartment communicating with the upper chamber of said other compartment, a pilot valve in said branch conduit for controlling the admission of vacuum to said upper chamber, and means in said cotton conduit in said zone of excess cotton accumulation operatively connected to said pilot valve responsive to the pressure of excess cotton for operating said pilot valve to actuate said motor to close said cutoff valve, said smaller diaphragm being effective to overbalance the weight of said cutoff valve, maintaining it in said open position when said pilot valve is closed.

7. A cutoff valve unit including a vacuum motor for operating the cutoff valve, adapted for intercalation in the vacuum conduit of a cotton handling system, said unit comprising a box-like casing having a partition dividing it into two compartments, one having aligned inlet and discharge openings in opposite sides near the bottom adapted to be connected to the adjacent ends of successive portions of said vacuum conduit to form part thereof, a gate type cutoff valve of unbalanced weight in said compartment swingable in a vertical plane about an axis within said compartment from a normally open position above said inlet opening to a closing position confronting said inlet opening, slightly spaced therefrom, partition means in said other compartment reducing the cross-section of the lower part thereof, a diaphragm motor in said other compartment comprising a reciprocatory member, spaced diaphragms of different area carried thereby and reciprocable therewith, the larger diaphragm substantially fitting the part of said other compartment of larger cross-section defining with the upper part of said compartment a chamber, the smaller diaphragm substantially fitting the part of smaller cross-section, said partition means and last named diaphragm defining with the lower part of said compartment a chamber, said partition having an opening placing the first named compartment in communication with the lower chamber of said other compartment, operating linkage between said cutoff valve and larger diaphragm, said compartments having connections at the top for a valve controlled branch conduit for admitting vacuum from the first compartment to the upper chamber of the other compartment, the larger diaphragm effecting the movement of the cutoff valve to closing position and the smaller diaphragm maintaining said cutoff valve open when said larger diaphragm is inactive.

References Cited in the file of this patent

UNITED STATES PATENTS

| Number | Name | Date |
|---|---|---|
| 682,816 | Seifert | Sept. 17, 1901 |
| 830,646 | Davis | Sept. 11, 1906 |
| 2,024,469 | Mitchell | Dec. 17, 1935 |
| 2,137,512 | Steinhauer | Nov. 22, 1938 |